04-04-72 OR 3,653,747

United States Patent

Kogelnik

[15] 3,653,747

[45] Apr. 4, 1972

[54] FOCUSING DEVICE FOR COLOR TELEVISION CAMERAS

[72] Inventor: Herwig Werner Kogelnik, Fair Haven, N.J.

[73] Assignee: Bell Telephone Laboratories Incorporated, Murray Hill, N.J.

[22] Filed: Nov. 10, 1970

[21] Appl. No.: 88,277

[52] U.S. Cl. ........................350/171, 178/5.4 ST, 178/5.4 E, 350/167, 350/169, 350/188

[51] Int. Cl. ..........................................................G02b 27/16

[58] Field of Search .........................350/188, 167, 169–174; 178/5.4 ST, 5.4 E

[56] References Cited

UNITED STATES PATENTS 1,556,982 10/1925 Weidert.................................350/188

2,696,520 12/1954 Bradley.............................178/5.4 ST 3,548,088 12/1970 Shimada............................178/5.4 ST

*Primary Examiner*—David Schonberg

*Assistant Examiner*—John W. Leonard

*Attorney*—R. J. Guenther and E. W. Adams, Jr.

[57] ABSTRACT

A two camera Kell type color system has a lenticular array of cylindrical lenslets of material of refractive index $n_2$ overlaid by a material of refractive index $n_1$, adjacent one camera where $n_2$ differs from $n_1$ in one region of the optical spectrum and is substantially equal to $n_1$ in another region of the spectrum.

4 Claims, 4 Drawing Figures

INVENTOR
H. W. KOGELNIK
BY David P. Kelley
ATTORNEY

FOCUSING DEVICE FOR COLOR TELEVISION CAMERAS

BACKGROUND OF THE INVENTION

This invention relates to color cameras for use in color television systems and, more particularly, to an improved color camera system of the so-called Kell type.

In U.S. Pat. No. 2,733,291 of R. D. Kell, issued Jan. 31, 1956, there is disclosed a single pick-up tube color camera system. A special optical arrangement for the camera includes striped color filters to produce spatial modulation of two of the three primary color images, most commonly the blue and red images. The scanning of the camera tube produces a composite video signal in which each of the red and blue primary colors appears as modulation of a distinct carrier frequency. Bandpass filters may then be used to separate the three individual primary color signals.

In general, such an arrangement is inefficient inasmuch as the absorption inherent in filters prevents maximum utilization of existing light. In addition, the filter or filters must be placed precisely in the optical system for proper resolution of the filter image on the faceplate of the picture tube. In some prior arrangements splitting of the image into three images for filtering and then recombining into one image after filtering introduces further losses and requires an unduly complicated optical system.

The optical system of one form of a Kell camera arrangement consists of two cameras, to one of which is directed the red and blue images, for example, and the green signal is directed to the other. Here, losses are still incurred through the filtering action.

SUMMARY OF THE INVENTION

The present invention produces the color separation required in a two camera Kell system without introducing the losses characteristic of filter arrangements.

In an illustrative embodiment of the invention, the optical image is split and directed into two paths. The image in one path is focused directly onto the faceplate of a camera tube, where it is scanned by the tube scanning system and converted to electrical signals. The image in the other path is directed onto the faceplate of a second camera tube through an array of cylindrical lenses. In accordance with the principles of the invention, the cylindrical lens structure is formed of two materials. The lenses themselves are formed on one surface of a member of one material, and the other material is overlaid on the lens structure. Where the two materials have materially different indices of refraction, as will be apparent hereinafter, light is focused by the lenses onto the faceplate of the camera tube in a series of discrete bands at an angle to the horizontal scan lines of the tube, whereas where the indices of refraction are substantially the same, light passes through unaffected. The materials of the present invention are so chosen that the indices of refraction thereof are materially different in, for example, the blue region of the spectrum and are substantially the same in, for example, the red regions of the spectrum, hence the blue component of the image is focused into a series of discrete bands on the camera tube faceplate while the red light is unaffected. As a consequence, a spatial modulation of the blue component is produced, thereby electrically superimposing the blue component upon a carrier wave, while the red component is at baseband.

It is a feature of the present invention that two of the component colors of an object scene are effectively electrically separated by means embodying the principles of the invention, without any substantial loss of light.

DETAILED DESCRIPTION

Figure 1:
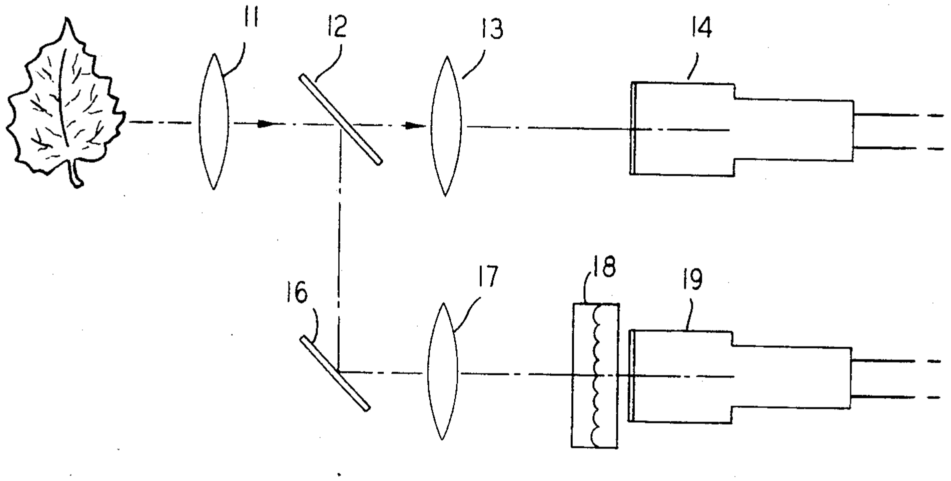
FIG. 1 depicts a simplified plan view of a color camera system embodying the principles of the present invention.

FIG. 1 depicts a two camera color system based upon the Kell color system and utilizing the principles of the present invention.

In the system of FIG. 1, light from an object scene passes through an object lens system 11, shown here as a single lens, to a dichroic beam splitter which passes, for example, the green components of the scene and reflects the blue and red components thereof. The green content of the scene is focused by a suitable relay lens arrangement onto the faceplate of a suitable single aperture image scanning device, i.e., camera tube 14, which, in accordance with known principles, generates electrical signals having characteristics that vary in accordance with the green content or luminance of the object scene. The output of the device 14 is, therefore, one of the component parts of the Kell type color signal.

The blue and red components of the scene are reflected by the beam splitter 12 and directed to a second reflecting member 16, through a relay lens 17, a selective focusing member 18, and onto the faceplate 20 of a second single aperture scanning device 19. As will be explained more fully hereinafter, member 18 has the effect of separating the blue and red components of the scene so that device 19 generates electrical signals which vary in accordance with the red content and the blue content of the scene in a manner such that they may be easily separated, as by electrical filtering.

Figure 2:
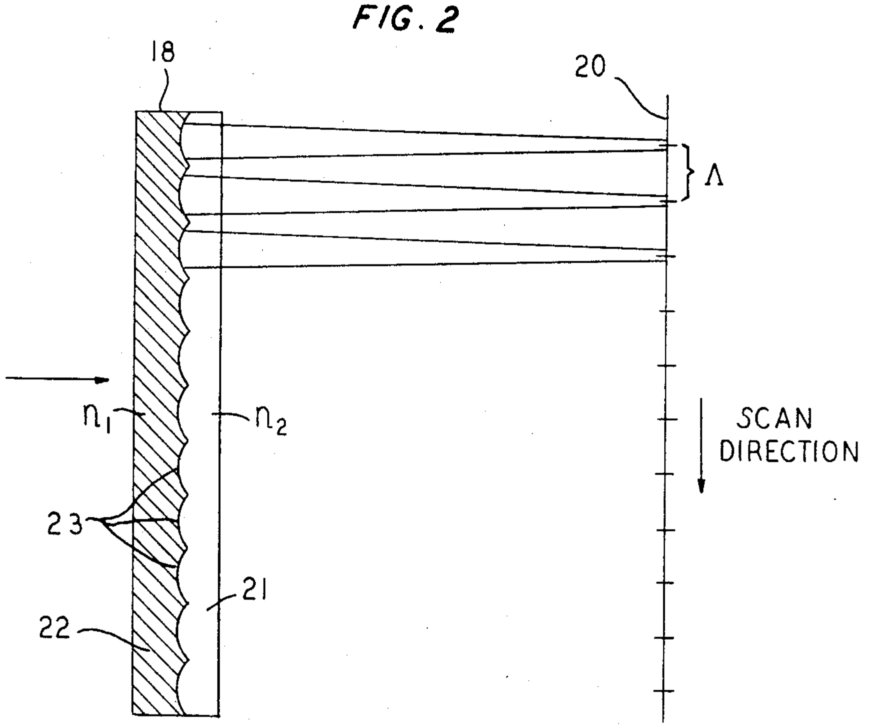
FIG. 2 is a cross sectional view of one element of the arrangement of FIG. 1.

In FIG. 2 there is shown a cross sectional view of a portion of the member 18 of FIG. 1, and a portion of the faceplate of the tube 19. Member 19 is composed of a first member 21 of a material having an index of refraction $n_2$, and a second member 22 of a material having an index of refraction $n_1$ and overlaying one surface of member 21. In accordance with the principles of the present invention, that surface of member 21 which is adjacent or in contact with member 22 has formed therein a plurality of cylindrical lenslets 23 (FIG. 2 is a plan view) which are oriented with their longitudinal dimension normal to the direction of the scanning lines of device 19. In FIG. 2, this longitudinal dimension extends normal to the plane of the drawing while the scan line direction is indicated by the arrow parallel to faceplate 20. In the arrangement of FIG. 2, when $n_1$ and $n_2$ are equal, light passes through element 18 relatively unaffected. On the other hand, where $n_1$ and $n_2$ are materially different, light passing through element 18 is focused by the lenslets into a series of discrete bands on the faceplate 20. In accordance with the principles of the present invention, the materials forming members 21 and 22 are so chosen that there is a large difference between their indices $n_1$ and $n_2$, where $n_2>n_1$, in one region of the spectrum, e.g., blue, while $n_1$ and $n_2$ are substantially the same in the other region of interest, e.g., red. With such a variation in indices, the red image is focused onto the entire faceplate 20, being unaffected by member 18, while the blue image is focused into a series of stripes on the faceplate 20, which, as is made clear in the aforementioned patent of Kell, produces a spatial modulation of the blue light, while the red light is unmodulated.

Figures 3, 4:
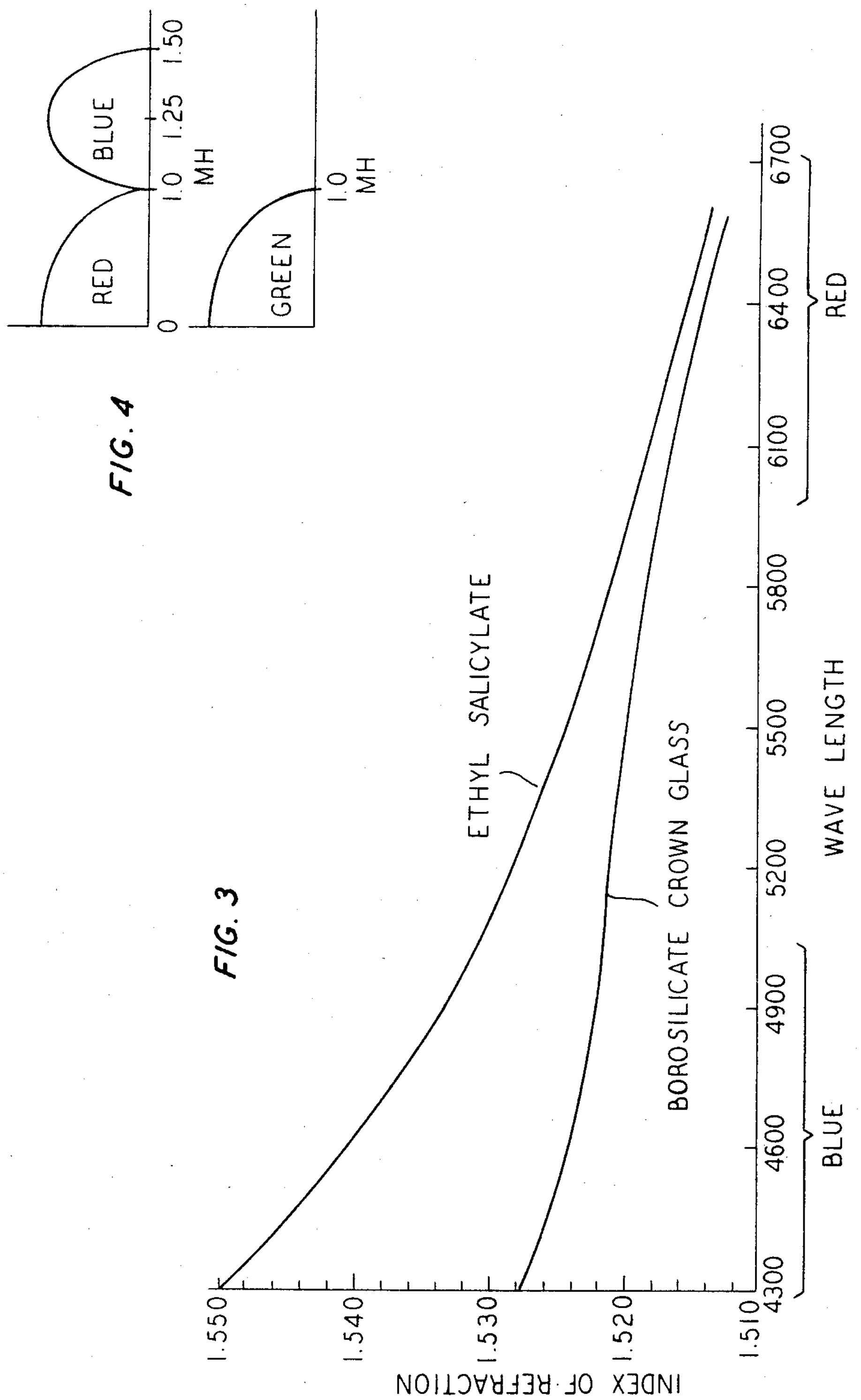
FIG. 3 is a series of curves illustrating the refractive index versus wavelength of materials used to form the element of FIG. 2.
FIG. 4 illustrates the bandpass characteristics of the output signals of the arrangement of FIG. 1.

In FIG. 3 there is shown the index of refraction curves for two materials suitable for use in the arrangement of FIG. 2, namely ethyl salicylate and borosilicate crown glass. It can be seen that in the blue region of the spectrum, i.e., 4,300 to approximately 5,000 Angstroms, the indices of the two materials are quite different, sufficiently so that blue light will be focused by the lenslets of member 18 when it is made of these two materials.

On the other hand, in the red region of the spectrum, i.e., approximately 6,000 to 6,700 Angstroms, the indices are very nearly the same value, and red light is relatively unaffected by member 18. Various other materials may also be used, such as, for example, polystyrene and cassia oil. Obviously, where one of the members is a liquid, member 18 must include suitable transparent means for containing the liquid. Also, where a liquid is used with a solid material, either concave or convex lenslets may be formed in the solid material, depending upon the indices of refraction. The focal length of a lenslet is given by $$f=(r/n_2-n_1) \quad (1)$$

where $r$ is the radius of curvature of the lens.

The number of lenslets is determined by resolution of the picture to be reproduced. Thus where device 19 produces 225 picture elements per line, there should be a greater number of blue stripes, such as for example, 400, thus 400 lenslets are required. The quality of the lenslets need not be high, indeed, a controlled reduction in quality can be used to reduce the bandwidth of the red and blue signals. In FIG. 4 there is shown the color bandpass characteristics of the system of FIG. 1. The figures given in FIG. 4 are illustrative of the distribution of the color bands, but are in no sense limiting. Various other values are, of course, possible. It can be seen that the blue band is centered on a carrier frequency of approximately 1.25 MHz, and is approximately 0.5 MHz wide. The red band plus one half the blue is at baseband, and is approximately 1.0 MHz wide. The green, or luminance, band, which is generated in device 14, is at baseband and is approximately 1.0 MHz wide. In accordance with known techniques, the red and blue signals may be readily separated by appropriate filtering, for example, with the result that the three desired color signals are obtained from the system of FIG. 1.

The foregoing has been for purposes of illustrating the principles of the present invention. Numerous arrangements may be devised by workers in the art utilizing these principles without departing from the spirit of the invention.

What is claimed is:

1. For use in a color camera system having a device for generating electrical signals from an optical image focused thereon, optical means for focusing one of the primary colors onto the device in a series of discrete strips while passing other primary colors directed therethrough to said device, said means comprising a first member of material of index of refraction $n_1$ and a second member of material of index of refraction $n_2$, said members forming a lenticular array of cylindrical lenses, and the materials being such that $n_1$ is different from $n_2$ for said one primary color and $n_1$ and $n_2$ are approximately equal for other of the primary colors.

2. The optical means as claimed in claim 1 wherein the number of cylindrical lenses exceeds the number of picture elements in a single scan line of said device.

3. The optical means as claimed in claim 1 wherein $n_2>n_1$ in the blue region of the optical spectrum and substantially the same in the red region of the optical spectrum.

4. The optical means as claimed in claim 3 wherein the material of said first member is borosilicate crown glass and the material of said second member is ethyl salicylate.

* * * * *

Notice of Adverse Decision in Interference

In Interference No. 98,418, involving Patent No. 3,653,747, H. W. Kogelnik, FOCUSING DEVICE FOR COLOR TELEVISION CAMERAS, final judgment adverse to the patentee was rendered Jan. 17, 1975, as to claims 1 and 3.

[*Official Gazette May 6, 1975.*]